United States Patent [19]

Schäfer

[11] Patent Number: 5,332,299
[45] Date of Patent: Jul. 26, 1994

[54] ANTI-LOCK CONTROL SYSTEM

[75] Inventor: Jochen Schäfer, Ludwigsburg, Fed. Rep. of Germany

[73] Assignee: Robert Bosch GmbH, Stuttgart, Fed. Rep. of Germany

[21] Appl. No.: 915,834

[22] PCT Filed: Jan. 19, 1991

[86] PCT No.: PCT/EP91/00097

§ 371 Date: May 24, 1992

§ 102(e) Date: May 24, 1992

[87] PCT Pub. No.: WO91/11354

PCT Pub. Date: Aug. 8, 1991

[30] Foreign Application Priority Data

Jan. 25, 1990 [DE] Fed. Rep. of Germany ....... 4002091

[51] Int. Cl.$^5$ .................................................. B60T 8/66
[52] U.S. Cl. ....................................... 303/94; 303/100;
303/103; 188/181 C; 364/426.02
[58] Field of Search .............. 303/94, 95, 97, 100,
303/107, 108, 113.2, 103, 104, 110, 111;
364/426.02, 426.03; 188/181 R, 181 A, 181 C

[56] References Cited

U.S. PATENT DOCUMENTS

| | | | |
|---|---|---|---|
| 3,754,797 | 8/1973 | Rodi et al. | 188/181 C |
| 4,964,045 | 10/1990 | Iwata et al. | 303/100 X |
| 5,005,132 | 4/1991 | Yoshino | 303/100 X |
| 5,083,631 | 1/1992 | Nakayama et al. | 303/100 X |

FOREIGN PATENT DOCUMENTS

| | | |
|---|---|---|
| 0336442 | 10/1989 | European Pat. Off. . |
| 0338538 | 10/1989 | European Pat. Off. . |
| 2331577 | 1/1974 | Fed. Rep. of Germany . |
| 3413738 | 10/1985 | Fed. Rep. of Germany . |
| 3614770 | 11/1987 | Fed. Rep. of Germany . |

*Primary Examiner*—Robert J. Oberleitner
*Assistant Examiner*—Peter M. Poon
*Attorney, Agent, or Firm*—Spencer, Frank & Schneider

[57] ABSTRACT

In the anti-lock control system described, the beginning of control is made more difficult in order to screen out disturbances. This is achieved by forming the sum or the average value of the slip values of at least the wheels of the front axle and, for triggering control, entering this sum or this average value into the instability criterion.

5 Claims, 1 Drawing Sheet

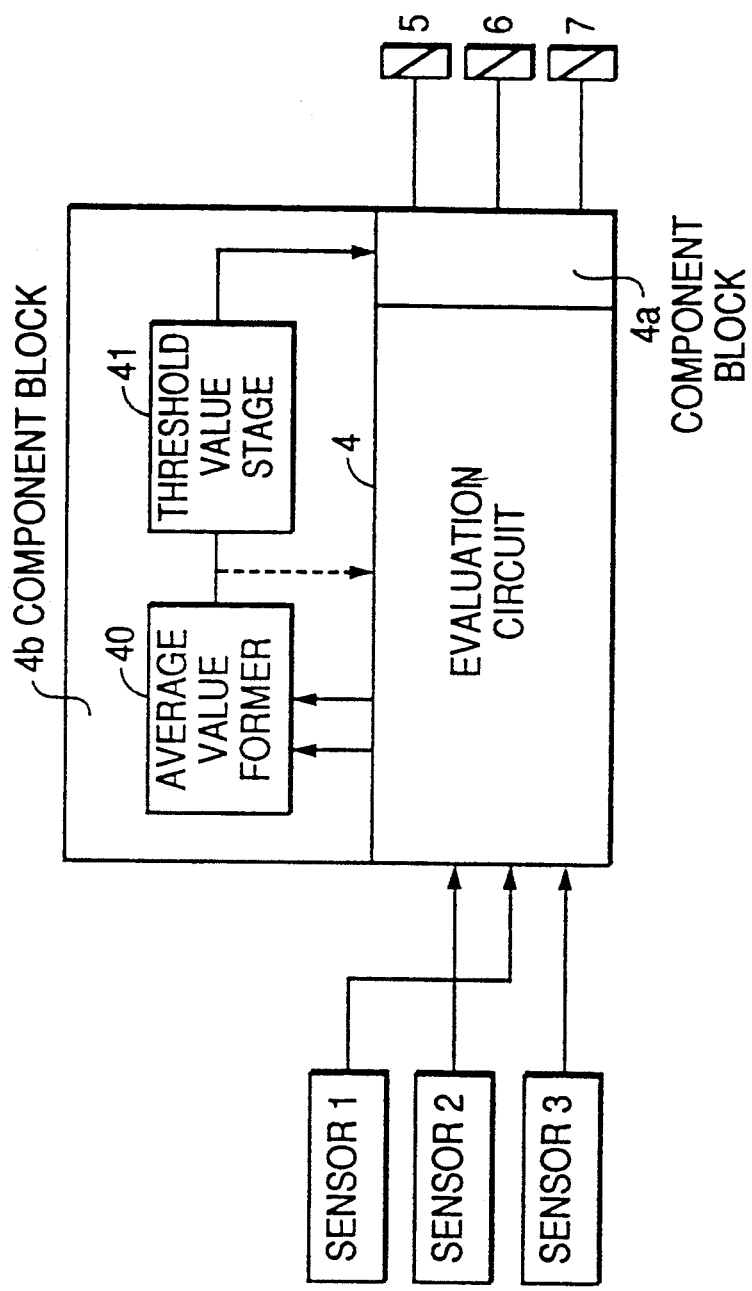

ANTI-LOCK CONTROL SYSTEM

BACKGROUND OF THE INVENTION

In a known method, the triggering of ABS control is made more difficult in order to avoid starting control unnecessarily due to disturbance signals.

SUMMARY OF THE INVENTION

An anti-lock control system for brakes of wheels of a motor vehicle, according to one embodiment of the invention, comprises: sensors for determining wheel speeds of the wheels of the motor vehicle and producing respective wheel speed signals; an evaluation circuit for receiving the wheel speed signals, and producing respective brake pressure control signals and wheel slip signals representing slip values for the wheels of the motor vehicle; brake pressure control devices for receiving the brake pressure control signals and varying brake pressure at the respective brakes of the wheels of the motor vehicle; and a component block, within the evaluation circuit, having a slip combination means for receiving the wheel slip signals produced in the evaluation circuit and producing a slip combination signal representing a slip combination value formed from an average value or a sum of at least the slip values for the wheels of one axle, and further having a threshold value means for receiving the slip combination signal and producing an output enable signal which is combined with a predetermined instability criterion, formed in the evaluation circuit from the wheel slip signals and the slip combination signal, to trigger production of the brake pressure control signals, the output enable signal being used to avoid the triggering of control by a disturbance on the signal of a single sensor, e.g. by a blow to the wheel. On the other hand, the control system remains sensitive to the occurrence of an instability at more than one wheel—preferably the two wheels of the front axle. The occurrence of an instability signal at both wheels is an indication that a tendency towards locking has in fact occurred. Whether or not control is then determined by a slip signal alone and/or additionally by a retardation signal or some other instability criterion, into which the slip signal of only one wheel then enters, is immaterial to the invention.

It is possible simply to form the average value or the sum of the slip values or, alternatively, additionally to assign to these slip values weighting factors which, for example, impose a larger weighting factor $K_1$ on the larger slip value $\lambda_1$. For these two cases, and assuming average value formation, the criteria for the beginning of control, assuming that the exceeding of a slip threshold determines the pressure reduction, are as follows:

Beginning of control at:

$$J_1 < \frac{\lambda_r + \lambda_1}{2}$$

or:

$$J_2 < \frac{K_1\lambda_1 + K_2\lambda_2}{2}$$

Here, $J_1$ and $J_2$ are limiting values and $\lambda_r$, $\lambda_l$, $\lambda_1$ and $\lambda_2$ are slip values. It is appropriate if $K_1+K_2=2$. In the case of sum formation, J is of course larger, for example twice as large. After control has been triggered, $\lambda_r$ or $\lambda_l$ is then compared to the slip threshold again.

The invention can also be used with other instability criteria, e.g. with criteria in accordance with German Offenlegungsschrift 3,614,770, in which wheel retardation values and slip values are integrated and then added and the sum then compared to a threshold value for the purpose of control. The invention can also be used with an instability criterion in accordance with the earlier Patent Application P 3841977.7, in which the instability criterion K is given by the following relation:

$$K = aB + bL + cIL + d \cdot a_{F2}$$

where a, b, c and d are constants, B is the wheel retardation, L is the wheel slip, IL is the integral of the wheel slip and $a_{F2}$ is the vehicle retardation. If K reaches a threshold, pressure reduction starts. For the beginning of control, L (in IL also) is not the slip of one wheel but the average value or in the case of corresponding other constants b and c, the sum of the slip values of an axle.

BRIEF DESCRIPTION OF THE DRAWING

The drawing shows a block diagram for an anti-lock control system according to an embodiment of the invention.

DETAILED DESCRIPTION OF THE PREFERRED EMBODIMENT

An illustrative embodiment of the invention is explained with reference to the drawing. There, wheel sensors assigned to the two front wheels are denoted by 1 and 2 and a wheel sensor assigned to the rear wheels is denoted by 3. The signals of these sensors are fed to an evaluation circuit 4 which, from the sensor signals, produces brake pressure control signals which are fed to brake pressure control valves 5 and 6 for the brakes of the front wheels and brake pressure control valve 7 for the brakes of the rear wheels. The output stages of the three control channels are accommodated in a component block 4a of the evaluation circuit.

The evaluation circuit 4 contains another component block 4b, in which an average value former 40 is accommodated. The slip values of the front wheels are fed from the main part of the evaluation 4 to the component block 4b. The slip values are formed in the evaluation circuit 4 and required there in any case for actual control. The slip average value determined in the average value former 40—taking into account weighting factors if appropriate—is fed to a threshold value stage 41 which emits a signal if a predetermined slip threshold value is exceeded. If there is only one slip value at one wheel, the threshold value stage 41 only emits a signal if the value is doubled (i.e. is insensitive in this case) but the slip threshold value is reached quite soon if there is slip at both wheels and an output signal is produced as a result. If the output stages of component block 4a were previously inhibited, the signal from the threshold value stage 41 switches them on until the end of control, i.e. the control signals present in the control channels can now influence the brake pressure. However, the output signal of the threshold value stage 41 can also influence the control channels in other ways.

In the case of a different instability criterion, e.g. the above-described K, the average value for L formed in 40 enters into the formation of the instability criterion for the individual wheels in block 4 first (dashed line). If control is then triggered, the slip value of each individual wheel enters into the associated instability criterion formation.

However, it is also possible to form the average value or the sum for a relatively large portion of the instability criterion and have this average value entered into the instability criterion formation for the beginning of control.

Finally, the average value (sum) of the instability criteria of the wheels of one axle can be formed and this can be used for triggering control.

In the illustrative embodiment, a block diagram has been chosen for the embodiment of the invention. However, the invention can also be embodied by means of a computer and the corresponding software.

I claim:

1. Anti-lock control system for brakes of wheels of a motor vehicle, comprising:
   sensors for determining wheel speeds of the wheels of the motor vehicle and producing respective wheel speed signals;
   an evaluation circuit for receiving the wheel speed signals, and producing respective brake pressure control signals and wheel slip signals representing slip values for the wheels of the motor vehicle;
   brake pressure control devices for receiving the brake pressure control signals and varying brake pressure at the respective brakes of the wheels of the motor vehicle; and
   a component block, within the evaluation circuit, having a slip combination means for receiving the wheel slip signals produced in the evaluation circuit and producing a slip combination signal representing a slip combination value formed from an average value or a sum of at least the slip values for the wheels of one axle, and further having a threshold value means for receiving the slip combination signal and producing an output enable signal which is combined with a predetermined instability criterion, formed in the evaluation circuit from the wheel slip signals and the slip combination signal, to trigger production of the brake pressure control signals, the output enable signal making triggering of the brake pressure control signals more difficult if a disturbance other than wheel locking has occurred.

2. Anti-lock control system according to claim 1, wherein the slip combination means uses different weighting factors for the slip values before the formation of the average value or the sum.

3. Anti-lock control system according to claim 2, wherein the slip combination means uses the slip values of the wheels of the front axle in the formation of the average value or sum.

4. Anti-lock control system according to claim 1, wherein the slip combination means uses the slip values of the wheels of the front axle in the formation of the average value or sum.

5. Anti-lock control system for brakes of wheels of a motor vehicle, comprising:
   sensor for determining wheel speeds of the wheels of the motor vehicle and producing respective wheel speed signals;
   an evaluation circuit for receiving the wheel speed signals, and producing respective brake pressure control signals and wheel slip signals representing slip values for the wheels of the motor vehicle;
   brake pressure control devices for receiving the brake pressure control signals and varying brake pressure at the respective brakes of the wheels of the motor vehicle; and
   a component block, within the evaluation circuit, having a slip combination means for receiving the wheel slip signals produced in the evaluation circuit and producing a slip combination signal representing a slip combination value formed from an average value or a sum of at least part of a predetermined instability criterion for at least the wheels of one axle, and further having a threshold value means for receiving the slip combination signal and producing an output enable signal which is combined with a predetermined instability criterion, formed in the evaluation circuit from the wheel slip signals and the slip combination signal, to trigger production of the brake pressure control signals, the output enable signal making triggering of the brake pressure control signals more difficult if a disturbance other than wheel locking has occurred.

* * * * *